No. 771,296. Patented October 4, 1904.

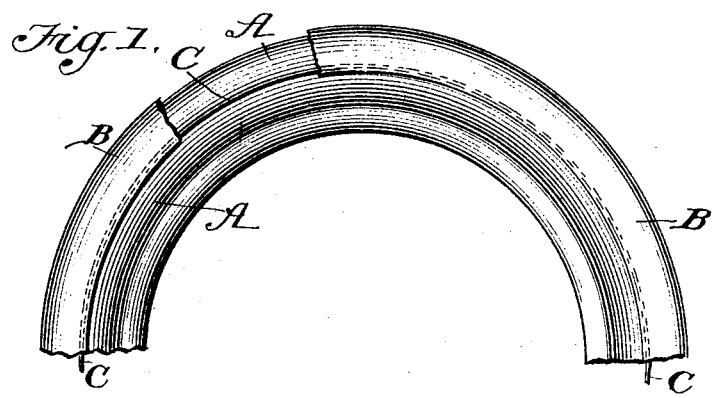
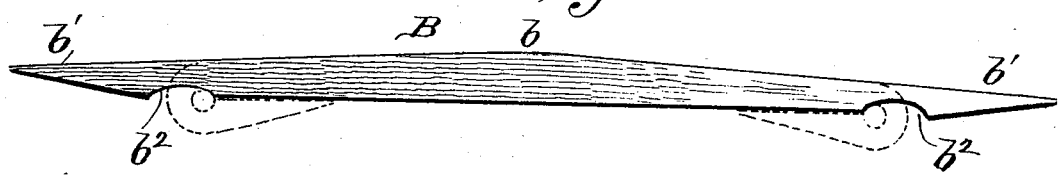
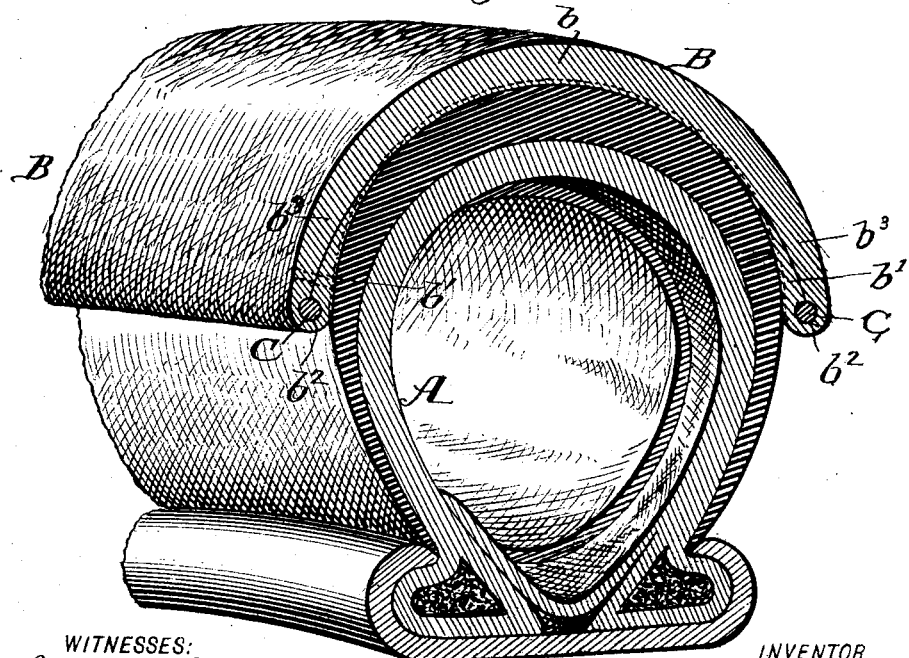

UNITED STATES PATENT OFFICE.

JAMES FULTON BURNAM, OF MADISON STATION, ALABAMA.

PROTECTOR FOR PNEUMATIC TIRES.

SPECIFICATION forming part of Letters Patent No. 771,296, dated October 4, 1904.

Application filed February 20, 1904. Serial No. 194,509. (No model.)

*To all whom it may concern:*

Be it known that I, JAMES FULTON BURNAM, a citizen of the United States, and a resident of Madison Station, in the county of Madison and State of Alabama, have made certain new and useful Improvements in Protectors for Pneumatic Tires, of which the following is a specification.

My invention is an improvement in that class of protectors for elastic wheel-tires of automobiles, bicycles, and other vehicles which are designed and adapted for application to the tread of such tires without inclosing the body of the same and whose purpose is to prolong the life of the tire by taking most of the friction and wear incident to use.

My invention is applied to pneumatic tires alone, it being made of pliant material and applied when the tires are collapsed, and it is subsequently held thereon by the expansion of the tire when inflated in the usual way. The protector being highly flexible or pliant, it conforms at all times to the tread of the tire without materially affecting the elasticity of the latter.

The details of construction and arrangement of parts are as hereinafter described, reference being had to the accompanying drawings, in which—

Figure 1 is a side view of a portion of a pneumatic tire with my improved protector applied thereto, a part of the protector being broken away. Fig. 2 is a cross-section of the protector extended flat. Fig. 3 is a sectional perspective view of a pneumatic tire with my improved protector applied as in practice.

In Figs. 1 and 3, A indicates a double pneumatic tire of well-known construction, and B my improved protector applied thereto. The protector is formed of some duly tough and pliant material, such as leather, paper, or cloth. The form of the same in cross-section is illustrated in Fig. 2, where it appears as a strip having a maximum thickness at the middle $b$ and tapering toward the ends $b'$, which are scarfed, and thus form an acute angle. It will be observed that the scarfing or beveling is on the inner side of the protector. Adjacent to the scarfs are shallow grooves $b^2$, the same being formed in the inner side of the protector. These grooves extend the entire length of the protector, and the latter is formed into the shape illustrated in Figs. 1 and 3, so that it is practically semicircular in cross-section when applied to the pneumatic tires A. The grooves $b^2$ adapt the protector to be folded at that point, as illustrated in Fig. 3—that is to say, the scarfed ends $b'$ are turned inward, and thus overlapped by the adjacent tapering portions $b^3$ of the protector. The grooves likewise provide space for rings C, formed of wire or other material having due tensile strength. The width of the protector is sufficient to enable it to inclose fully half of the pneumatic tire A, or, in other words, so that the rings C are opposite the central portion of the tire when expanded. The rings C are continuous, and thus adapted either for expansion or contraction. In other words, they are always made of a uniform diameter, this being according to the diameter of the wheel to which the protector is applied. The rings C are made of some material which has a good degree of flexibility in order that they may follow, to a certain degree at least, the undulations or bends of the pneumatic tire A when subjected to pressure as in use. It will be noticed that the grooves $b^2$ form when the ends are folded a cylindrical passage adapted to receive the rings and that the lap of the scarfed ends of the protector holds the latter by friction between the body of the protector and the pneumatic tire. It is to be understood, however, that, if desired, supplemental means for fastening such ends $b'$ may be employed—as, for instance, wires or stitches passing through parts $b'$ $b^3$. It will be further noted that the taper of the protector at a point adjacent to the grooves and the scarfs $b'$ reduces the thickness of the folded parts, so that the protector does not project laterally to an undue degree on the sides of the pneumatic tire.

As has been before intimated, my invention is applicable and applied only to pneumatic tires or such as are collapsible and required to be inflated for use. Thus, unlike another well-known class of tire-protectors, my protector is made of the required diameter at the outset and the fastenings C also made continuous or integral and their diameter determined in advance. The protector, with the rings C inclosed in its edge folds or laps, is first prepared and then applied to a pneumatic tire when collapsed. The tire being then inflated, the protector is distended or stretched to its full capacity and is thus held firmly and closely upon the pneumatic tire, as indicated in the drawings. The protector has thus, in effect, practically the same relation to the pneumatic tire as a half-sole to a boot or shoe and is adapted to take the wear and tear incident to use, so that the life of the pneumatic tire is greatly prolonged. At the same time the pliability of the protector is such that it conforms readily to the undulations or bends of the pneumatic tire. The protector being held in place entirely by the expansion of the tire, it is evident that by collapsing the latter the protector proper, with its securing-rings, may be readily removed. The folds or laps of the protector being at a line where the transverse diameter of the pneumatic tire is greatest, the protector has no tendency to leave the tire, but is held at all times firmly or without slipping. Glue or cement may be applied between the tire proper and the protector as a further means for holding the latter.

My improved protector is distinguished by simplicity and cheapness of construction, ease of application, durability, and elasticity in use.

What I claim is—

1. The combination, with a collapsible and inflatable tire, of the protector hereinbefore described, the same having an annular form and made semicircular in cross-section to adapt it to conform to and receive the said tire, its sides being provided with grooves and its edges being scarfed and lapped as shown, and continuous rings held by the folds in the space provided by the grooves, as shown and described.

2. The combination, with a pneumatic tire of the protector hereinbefore described, the same being constructed of pliant material and tapered laterally in each direction and having scarfed ends with adjacent grooves in the under side, the scarfed portions being folded inward, and rings held in the spaces provided by the grooves, the width of the protector relative to the tire being such that the folds of its edge portions are adjacent to the greatest diameter of the tire, substantially as described.

3. The combination, with a pneumatic tire of a protector consisting of a strip of duly tough and pliant material, the same being laid upon the periphery of the pneumatic tire, and its side edges turned inward and lapped, and rings inclosed by the folded or lapped portions, substantially as shown and described.

JAMES FULTON BURNAM.

Witnesses:
JOHN REDDEN SLACK,
FRANK GARBER HERTZLER.